United States Patent [19]

Hasegawa

[11] 4,438,744

[45] Mar. 27, 1984

[54] IDLING RPM FEEDBACK CONTROL METHOD FOR INTERNAL COMBUSTION ENGINES

[75] Inventor: Shumpei Hasegawa, Niiza, Japan

[73] Assignee: Honda Motor Co., Ltd., Tokyo, Japan

[21] Appl. No.: 456,866

[22] Filed: Jan. 10, 1983

[30] Foreign Application Priority Data

Jan. 18, 1982 [JP] Japan .................................. 57-5838

[51] Int. Cl.³ ............................................ F02M 23/06
[52] U.S. Cl. .................................... 123/327; 123/339; 123/585
[58] Field of Search ........ 123/320, 327, 339, 585–589, 123/493

[56] References Cited

U.S. PATENT DOCUMENTS

4,237,838 12/1980 Kinugawa et al. .................. 123/327
4,306,527 12/1981 Kinugawa et al. .................. 123/327
4,386,591 6/1983 Nagase et al. ....................... 123/339

Primary Examiner—William A. Cuchlinski, Jr.
Attorney, Agent, or Firm—Arthur L. Lessler

[57] ABSTRACT

An idling rpm feedback control method for controlling the quantity of supplementary air being supplied to an internal combustion engine, in a feedback manner responsive to the difference between actual engine rpm and desired idling rpm at engine idle. When the engine is decelerated with the throttle valve fully closed and before the feedback control is started, the supplementary air quantity is controlled in decelerating mode in a predetermined manner while the engine speed drops from predetermined rpm larger than an upper limit of the desired idling rpm range to the same upper limit, and in feedback mode after the engine speed has dropped below the above upper limit, respectively. The feedback control is continued even when the engine speed temporarily rises above the upper limit. In the decelerating mode, the supplementary air quantity is gradually increased with a decrease in the engine rpm.

2 Claims, 5 Drawing Figures

IDLING RPM FEEDBACK CONTROL METHOD FOR INTERNAL COMBUSTION ENGINES

BACKGROUND OF THE INVENTION

This invention relates to an idling rpm feedback control method for internal combustion engines, and more particularly to a method of this kind which is adapted to discriminate between a decelerating condition of an engine and an idling rpm feedback controlling condition of the engine to prevent engine stall and enhance the driveability of the engine.

In an internal combustion engine, the engine can easily stall due to a drop in the engine speed when the engine is operated in an idling condition at a low temperature of the engine cooling water or when the engine is heavily loaded with loads by head lamps, air conditioner, etc. in a vehicle equipped with the engine. To eliminate such disadvantage, an idling rpm feedback control method has been propsoed e.g. by Japanese Patent Provisional Publication (Kokai) No. 55-98628, which comprises setting desired idling rpm in dependence upon engine load of the engine, detecting the difference between actual engine rpm and the desired idling rpm, and supplying a quantity of supplementary air to the engine in a manner responsive to the detected difference so as to minimize the same difference, to thereby control the engine rpm to the desired idling rpm.

According to this proposed method, if the idling rpm feedback control is carried out immediately when the engine is decelerated toward the desired idling rpm region and before the engine speed drops to the desired idling rpm region, the resulting controlled quantity of supplementary air is much smaller than a required quantity to be supplied to the engine, because on such occasion the supplementary air quantity is controlled to such a small value as to immediately bring the engine rpm to the desired idling rpm. If on such occasion the clutch of the engine is disengaged, there occurs a sudden drop in the engine speed, which can cause engine stall.

To avoid this disadvantage, an idling rpm feedback control method has been proposed e.g. by Japanese Patent Provisional Publication (Kokai) No. 55-98629. According to this proposed method, in transition from a decelerating condition to an idling rpm feedback controlling condition, the quantity of supplementary air is controlled in decelerating mode wherein supplementary air is previously supplied to the engine in a quantity corresponding to a drop in the engine speed before the idling rpm feedback control is started, to thereby ensure smooth transition to the idling operation.

However, once the idling rpm feedback control has been started, it is desirable for prompt control of the engine rpm to continue the feedback control even when the engine is released from electrical loads such as head lamps to have its speed increased to such high engine rpm that the supplementary air quantity should be controlled in decelerating mode. To this end, it is necessary to exactly determine whether the engine is in an operating condition requiring control of the supplementary air quantity in decelerating with the throttle valve fully closed mode or in an operating condition requring feedback control of the same quantity.

SUMMARY OF THE INVENTION

It is the object of the invention to provide an idling rpm feedback control method which is adapted to exactly determine whether control of the supplementary air quantity should be carried out in decelerating mode or in feedback mode, to thereby prevent engine stall during deceleration of the engine and also achieve accurate and stable feedback control of the idling engine rpm.

According to the invention, a method is provided for controlling the quantity of supplementary air being supplied to an internal combustion engine through an air passage in a feedback manner responsive to the difference between actual engine rpm and desired idling rpm. The air passage communciates at one end with the intake passage of the engine at a location downstream of a throttle valve arranged therein and at the other end with the atmosphere. The method is characterized by comprising the steps of (a) comparing an actual value of engine rpm with a first predetermined value which is larger than an upper limit of a desired idling rpm range including the above desired idling rpm, (b) comparing the actual value with a second predetermined value which is equal to the above upper limit of the desired idling rpm range when it is determined at the step (a) that the actual value is smaller than the first predetermined value, (c) effecting control of the supplementary air quantity in feedback mode when it is determined at the step (b) that the actual value is smaller than the second predetermined value, (d) determining whether or not the control of the supplementary air quantity was effected in feedback mode immediately before the determination at the step (b) when it is determined at the step (b) that the actual value is larger than the second predetermined value, (e) continuing the feedback control of the supplementary air quantity when the result of the determination at the step (d) is affirmative, and (f) effecting control of the supplementary air quantity in decelerating mode in a predetermined manner when the result of the determination at the step (d) is negative.

Preferably, the above predetermined decelerating manner is such that the supplementary air quantity is gradually increased with a decrease in the engine rpm, and when the engine speed decreases to the above-mentioned second predetermined value, the supplementary air quantity is held at a predetermined value.

The above and other objects, features and advantages of the invention will be more apparent from the ensuing detailed description taken in connection with the accompanying drawings.

DETAILED DESCRIPTION

The method of the invention will be described in detail with reference to the accompanying drawings.

Figure 1:
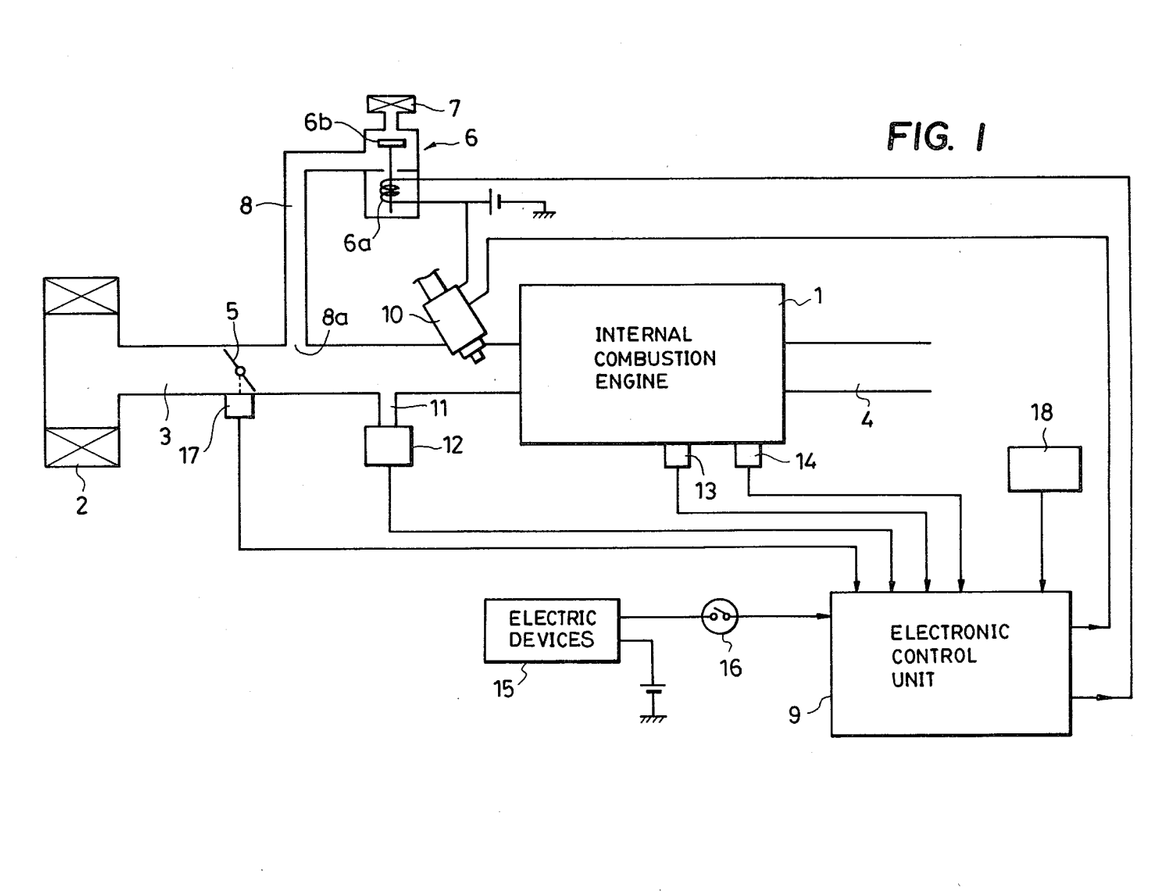
FIG. 1 is a block diagram illustrating the whole arrangement of an idling rpm feedback control system to which is applicable the method of the invention.

Referring first to FIG. 1, an idling rpm feedback control system is schematically illustrated, to which is applicable the method of the invention. In FIG. 1, reference numeral 1 designates an internal combustion engine which may be a four-cylinder type, and to which are connected an intake pipe 3 with an air cleaner 2 mounted at its open end and an exhaust pipe 4, at an intake side and an exhaust side of the engine 1, respectively. A throttle valve 5 is arranged within the intake pipe 3, and an air passage 8 opens at its one end 8a in the intake pipe 3 at a location downstream of the throttle valve 5. The air passage 8 has its other end communicating with the atmosphere and provided with an air cleaner 7. A supplementary air quantity control valve (hereinafter called merely "the control valve") 6 is arranged across the air passage 8 to control the quantity of supplementary air being supplied to the engine 1 through the air passage 8. This control valve 6 is a normally closed type and comprises a solenoid 6a and a valve 6b disposed to open the air passage 8 when the solenoid 6a is energized. The solenoid 6a is electrically connected to an electronic control unit (hereinafter called "ECU") 9. A fuel injection valve 10 is arranged in a manner projected into the intake pipe 3 at a location between the engine 1 and the open end 8a of the air passage 8, and is connected to a fuel pump, not shown, and also electrically connected to the ECU 9.

A throttle valve opening sensor 17 is mounted on the throttle valve 5, and an absolute pressure sensor 12 is provided in communication with the intake pipe 3 through a conduit 11 at a location downstream of the open end 8a of the air passage 8, while an engine cooling water temperature sensor 13 and an engine rpm sensor 14 are both mounted on the body of the engine 1. All the sensors and other sensors 18 for detecting other parameters of the operating condition of the engine 1 are electrically connected to the ECU 9. Reference numeral 15 designates electric devices such as head lamps and an air conditioner, which are electrically connected to the ECU 9 by way of a switch 16.

The idling rpm feedback control system constructed above operates as follows: Engine operation parameter signals generated by the throttle valve opening sensor 17, the absolute pressure sensor 12, the engine cooling water temperature sensor 13, the engine rpm sensor 14 and the other sensors 18 are supplied to the ECU 9. Then, the ECU 9 determines operating conditions of the engine 1 and electrical loads on same on the basis of the read values of these engine operation parameters and a signal indicative of electrical loads on the engine supplied to the ECU 9 from the electric devices 15, and then calculates a desired quantity of fuel to be supplied to the engine 1, that is, a desired valve opening period of the fuel injection valve 10, and also a desired quantity of supplementary air to be supplied to the engine 1, that is, a desired valve opening period of the control valve 6, on the basis of the determined operating conditions of the engine and electrical loads on the engine. Then, the ECU 9 supplies driving pulses corresponding to the calculated values to the fuel injection valve 10 and the control valve 6. The valve opening period of the control valve 6 is determined by the ratio of the on-state period to the pulse separation of a signal synchronous with the rotation of the engine 1, e.g. a pulse signal having each pulse generated at a predetermined crank angle of the engine 1, or a pulse signal having its pulses generated at constant time intervals. The above valve opening determining signal, whether it is the engine rotation synchronous signal or the constant time interval pulse signal, is also used as a timing signal for initiation of a method for discriminating between decelerating mode and feedback mode, according to the invention, hereinafter described.

The control valve 6 is energized by each of its driving pulses to open the air passage for a period of time corresponding to its calculated valve opening period value so that a quantity of supplementary air corresponding to the calculated valve opening period value is supplied to the engine 1 through the air passage 8 and the intake pipe 3.

The fuel injection valve 10 is energized by each of its driving pulses to open for a period of time corresponding to its calculated valve opening period value to inject fuel into the intake pipe 3. The ECU 5 operates so as to supply an air/fuel mixture having a predetermined air/fuel ratio, e.g. a theoretical air/fuel ratio, to the engine 1.

When the valve opening period of the control valve 6 is increased to increase the quantity of supplementary air, an increased quantity of the mixture is supplied to the engine 1 to increase the engine output, resulting in an increase in the engine rpm, whereas a decrease in the above valve opening period causes a corresponding decrease in the quantity of the mixture, resulting in a decrease in the engine rpm. In this manner, the engine speed is controlled by controlling the quantity of supplementary air or the valve opening period of the control valve 6.

Figure 2:
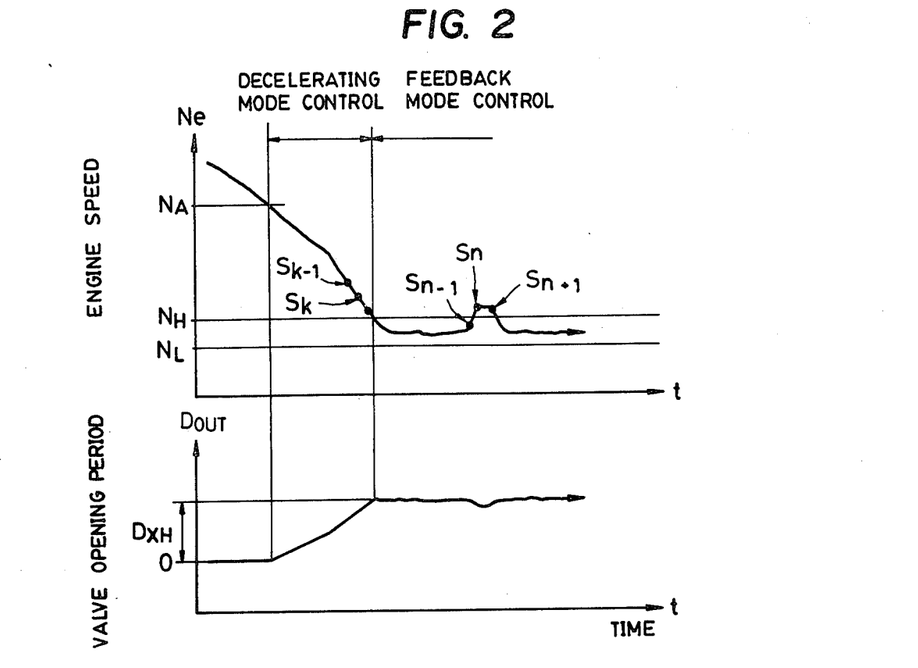
FIG. 2 is a timing chart showing the method of the invention.

Details of the idling rpm control operation of the idling rpm feedback control system constructed above will now described with reference to FIG. 1 previously referred to and FIGS. 2 through 5. As shown in FIG. 2, according to the invention, when the throttle valve 5 is fully closed to decelerate the engine so that the engine speed decreases with a lapse of time to a predetermined rpm NA (e.g. 1500 rpm), the control valve 6 is opened to allow supply of the supplementary air to the engine 1 through the air passage 8 to initiate control of the supplementary air quantity in decelerating mode, in a manner as hereinafter described. When the engine speed further decreases below an upper limit NH of a desired idling rpm range, referred to later, the supplementary air quantity is controlled in feedback mode so as to be maintained between the upper limit NH and a lower limit NL of the desired idling rpm range. These upper and lower limits of the desired idling rpm range are provided for stable control of the idling rpm. They are set at values higher and lower by a predetermined rpm value (e.g. 30 rpm) than a central value of a desired idling rpm range which is set to a value appropriate to the engine operation in dependence upon engine cooling water temperature, electrical loads of the electric devices 15, etc. each time there occurs a change in any of these parameters. When the actual engine speed lies between the upper limit NH and the lower limit NL, the ECU 9 regards that the engine rpm is equal to the desired idling rpm.

The supplementary air quantity or the valve opening period of the control valve 6 to be controlled in decelerating mode is set so as to increase with a decrease in the engine rpm and controlled to a predetermined valve opening period DXH when the engine speed Ne decreases to the upper limit NH of the desired idling rpm range.

Figure 3:
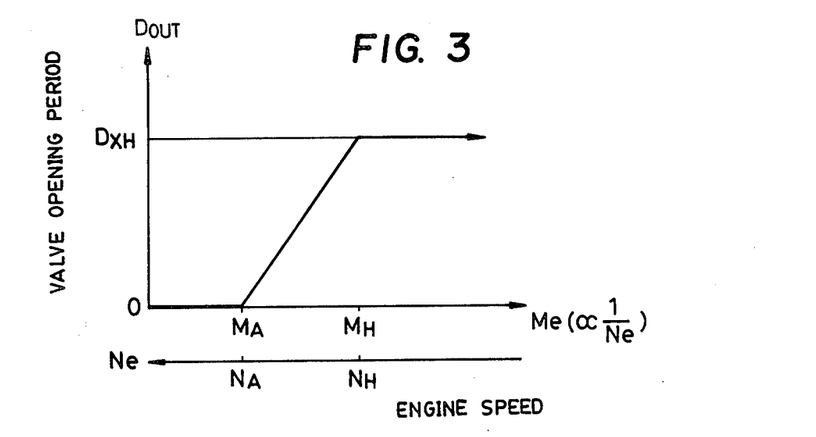
FIG. 3 is a graph showing the relationship between the valve opening period of a control valve for control of the supplementary air quantity or engine rpm, applicable during control in decelerating mode according to the invention.

FIG. 3 shows an example of the relationship between the valve opening period DOUT of the control valve 6 and the engine speed, applicable during the above decelerating control. As shown in the graph, when the engine speed Ne lies between the predetermined rpm NA and the upper limit NH of the desired idling rpm range, the valve opening period DOUT is set to a value DX variable dependent upon a value Me proportional to the reciprocal of the engine rpm Ne. When the value of engine rpm Ne is larger than or equal to the value NA, the valve opening period DOUT is set to zero, while when the value of engine rpm Ne is smaller than or equal to the value NH, the value DX is set to the predetermined value DXH. The above predetermined valve opening period DXH is set at such a value that the desired idling rpm can be achieved when the engine is not loaded with any load such as electrical loads, at idle. The reciprocal value Me is used for the convenience of processing operation within the ECU 9, and represents the time interval between adjacent pulses of a pulse signal indicative of engine rpm and generated by the engine rpm sensor 14, which becomes smaller with an increase in the engine rpm Ne.

As mentioned above, according to the invention, in decelerating the engine with the throttle valve fully closed, the open loop decelerating control is carried out before entering the idling rpm feedback control. That is, the idling rpm feedback control is not immediately initiated at such deceleration to avoid an excessive drop in the engine speed upon entering the feedback control. Further, the supplementary air quantity is gradually increased with a decrease in the engine rpm after the engine speed has decreased below the predetermined rpm NA. Therefore, engine stall can be avoided even if the engine clutch is disengaged during the engine deceleration or the feedback control.

The idling rpm feedback control is carried out as follows: The ECU 9 detects the difference between the upper or lower limit NH or NL of the desired idling rpm range set to a value depending upon engine load as previously mentioned, and the actual engine rpm Ne obtained by the engine rpm sensor 14, sets the valve opening period of the control valve 6 to such a value as corresponds to the detected difference and makes the same difference zero, and opens the control valve 6 for a period of time corresponding to the set valve opening period to control the supplementary air quantity, thereby controlling the engine rpm to a value between the upper and lower limits NH and NL, i.e. the desired engine rpm.

During the above feedback control of the supplementary air quantity at engine idle, the engine speed can temporarily rise above the upper desired rpm limit NH, due to external disturbances or extinction of the engine load caused by switching-off of the electric devices 15, as indicated by the symbol Sn in FIG. 2. In such event, the ECU 9 determines whether or not control of the supplementary air quantity in the preceding loop was effected in feedback mode. This determination is provided to ensure continuation of the idling rpm feedback control without being affected by disturbances in the engine rpm caused by external disturbances, etc. once the same feedback control has been initiated. In the example of FIG. 2, it is noted that the preceding loop Sn−1 was in feedback mode. Therefore, the feedback control is continued also in the present loop Sn. Further, in the FIG. 2 example, it will be also determined by the ECU 9 that the present loop Sn is in feedback mode if the engine speed still exceeds the upper limit NH in the next loop Sn+1 as in the same example, and the feedback control will be continued also in the next loop. In this manner, once the feedback control has been started immediately after termination of the decelerating control, the same feedback control is continuously effected so long as the throttle valve 5 is kept closed, even if the engine speed temporarily rises above the upper limit NH due to external disturbances, to thereby achieve stable idling rpm feedback control.

On the other hand, during the control in decelerating mode, so long as the engine speed remains above the upper limit NH as indicated by the symbol Sk in FIG. 2, the ECU 9 determines whether or not the preceding loop Sk−1 was in decelerating mode, and continues the decelerating control also in the present loop Sk if the preceding loop was in decelerating mode. This makes it possibe to avoid that the ECU 9 wrongly judges that the engine is in a feedback-mode controlling region, though in fact the engine is still in a decelerating-mode controlling region with the engine rpm above the upper idling rpm limit NH, and also that the valve opening period of the control valve 6 is controlled to an extremely small value when the feedback control is erroneously carried out due to the above misjudgement, causing engine stall upon disengagement of the clutch.

Figure 4:
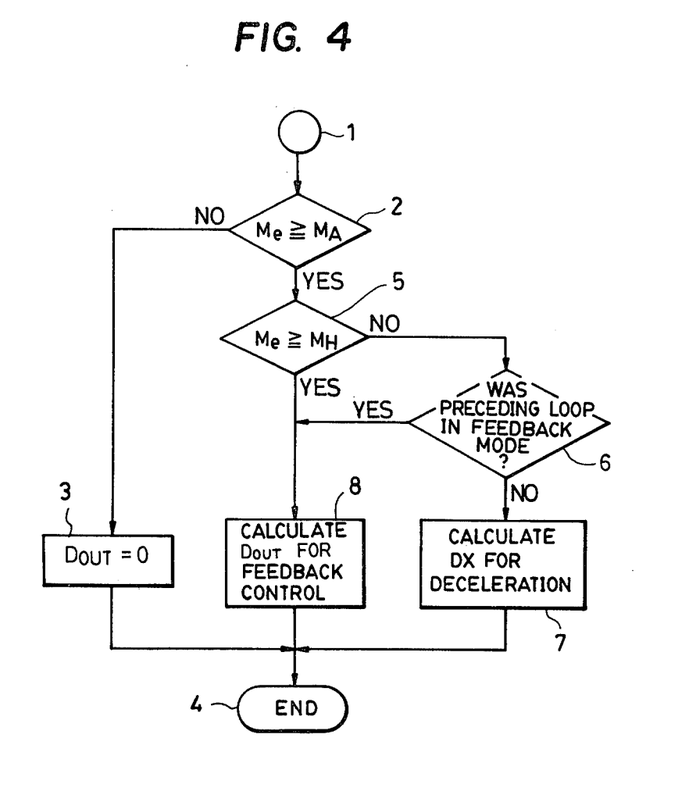
FIG. 4 is a flow chart showing a routine for executing the method of the invention, which can be executed within an electronic control unit (ECU) in FIG. 1.

FIG. 4 is a flow chart showing a routine for executing the above described control of the supplementary air quantity in decelerating mode and in feedback mode. This routine is executed in synchronism with a pulse signal having each pulse generated at a predetermined crank angle of the engine 1 or a pulse signal having its pulses generated at constant time intervals. In the ECU 9, this routine is called when the throttle valve 5 becomes fully closed, at the step 1. First, the value Me proportional to the reciprocal of the engine rpm Ne is compared with a value MA which is proportional to the reciprocal of the aforementioned predetermined rpm NA, at the step 2. When the relationship of Me≧MA does not stand, that is, the actual engine rpm Ne is larger than the value NA, supply of the supplementary air is not necessary, and accordingly the valve opening period DX of the control valve 6 is set to zero, at the step 3, and then the execution of the present loop of the routine is terminated at the step 4.

When the relationship of Me≧MA stands at the step 2, that is, the engine rpm Ne is smaller than the predetermined value NA, the program proceeds to the step 5, where comparison is made between the value Me proportional to the reciprocal of the engine rpm Ne and a value MH proportional to the reciprocal of the upper limit NH of the desired idling rpm range. When the relationship of Me≧MH does not stand, that is, the engine rpm Ne is larger than the upper limit NH, it is determined at the step 6 whether or not the preceding loop was in feedback mode. If the answer is negative or no, the ECU 9 regards that the present loop should be in decelerating mode, and calculates the valve opening period DX for application in decelerating mode in the manner shown in FIG. 3, at the step 7.

When the relationship of Me≧MH stands at the step 5, that is, the engine speed decreases below the upper limit NH of the desired idling rpm range, the program proceeds from the control in decelerating mode to the idling rpm control in feedback mode, where the valve opening period DOUT is calculated for application in the feedback control in the aforedescribed manner, at the step 8. If the answer to the question of the step 6 is affirmative, that is, the preceding loop was in feedback mode, the program also proceeds to the step 8 to continue the feedback control.

The above described method of the invention can be programmed in the following manner, by way of example, using a mnemonic code, which is applicable, for instance, to Model 8048 of Intel used as the one chip CPU in the ECU 9, hereinafter referred to:

| MOV | R1, ME | (1) |
|---|---|---|
| MOV | A, @R1 | (2) |
| MOV | R2, A | (3) |
| MOV | R1, MA | (4) |
| MOV | A, @R1 | (5) |
| CPL | A | (6) |
| INC | A | (7) |
| CLR | C | (8) |
| ADD | A, #2 | (9) |
| JNC | SUBSTP | (10) |
| MOV | R1, MH | (11) |
| MOV | A, @R1 | (12) |
| CPL | A | (13) |
| INC | A | (14) |
| CLR | A | (15) |
| ADD | A, R2 | (16) |
| JC | SUBFB | (17) |
| MOV | R1, FLG1 | (18) |
| MOV | A, @R1 | (19) |
| JNZ | SUBFB | (20) |
| JMP | SUBDEC | (21) |

The step (1) of the program instructs to move the value Me proportional to the reciprocal of the engine rpm Ne from a register ME in the CPU to a register R1 in the CPU, while the step (4) instructs to move the value NA proportional to the reciprocal of the predetermined rpm NA from a register MA in the CPU to the above register R1. At the step (6), a value Me—Ma is loaded into a further register A in the CPU. If the value Me is smaller than the value Ma, the program jumps at the step 10 to a subroutine SUPSTP where the valve opening period of the control valve 6 is set to zero according to the step 3 in FIG. 4. If the value Me is larger than or equal to the value MA, the value MH proportional to the reciprocal of the upper limit NH of the desired idling rpm range, stored in a register MH in the CPU is moved to the register R1, at the step 11. At the step 13, the value Me—MH is loaded into the register A. If the value Me is larger than or equal to the value MH, the program jumps at the step 17 to another subroutine SUBFB for calculating the valve opening period of the control valve 6 for feedback control. If the value Me is smaller than the value MH, a flag signal is issued, which is indicative of whether or not the control in the preceding loop was effected in feedback mode, at the step 18. If the answer is negative, the program jumps at the step 20 to a subroutine SUBDEC for calculating the valve opening period of the control valve 6 for decelerating control.

Next, the electrical circuit in the ECU 9 will now be described by referring to FIG. 5 which illustrates an embodiment thereof.

The engine rpm sensor 14 in FIG. 1 is connected to an input terminal 902a of a one chip CPU (hereinafter merely called "CPU") 902 by way of a waveform shaper 901, both provided in the ECU 9. Reference numeral 15' represents sensor means for detecting the electrical loads of the electric devices 15 in FIG. 5, which are connected to respective ones of a group of further input terminals 902b of the CPU 902 by way of a level shifter 904 in the ECU 9. The water temperature sensor 13 and the throttle valve opening sensor 17 are connected, respectively, to input terminals 905a and 905b of an analog-to-digital converter 905 and are also both connected to the input of a fuel supply control unit 903. The analog-to-digital converter 905 has an output terminal 905c connected to the input terminals 902b of the CPU 902 and a group of further input terminals 905d connected to a group of output terminals 902c of the CPU 902. A pulse generator 906 is connected to another input terminal 902d of the CPU 902 which in turn has an output terminal 902e connected to an AND circuit 908 at their one input terminals, by way of a frequency divider 907. The AND circuit 908 has its output connected to a clock pulse input terminal CK of a down counter 909. The AND circuit 908 has its other input terminal connected to a borrow output terminal B of the down counter 909 which terminal is further connected to the solenoid 6a of the control valve 6 in FIG. 1, by way of a solenoid driving circuit 911. The CPU 902 has another group of output terminals 902f, one of which is connected to a load input terminal L of the down counter 909. The analog-to-digital converter 905, the CPU 902, and the down counter 909 are connected together by way of a data bus 912, respectively, at an output terminal 905e, an input and output terminal 902g, and an input terminal 909a.

Connected to the fuel supply control unit 903 are the intake air pressure or absolute pressure sensor 12 and the other engine parameter sensors 18 such as an atmospheric pressure sensor, all appearing in FIG. 1. The output of the fuel supply control unit 903 is connected to the fuel injection valve 10 in FIG. 1.

The electrical circuit of the ECU 9 constructed above operates as follows: An output signal from the engine rpm sensor 14 is supplied to the ECU 9 as a signal indicative of engine rpm Ne as well as a signal indicative of a predetermined crank angle of the engine 1, where it is subjected to waveform shaping by the waveform shaper 901 and then supplied to the CPU 902 and the fuel supply control unit 903. Upon being supplied with this top dead center signal, the CPU 902 generates a chip selecting signal, a channel selecting signal, an analog-to-digital conversion starting signal, etc. the latter commanding the analog-to-digital converter 905 to convert analog signals such as the engine cooling water temperature signal and the throttle valve opening signal from the cooling water temperature sensor 13 and the throttle valve opening sensor 17 into corresponding digital signals. The digital signals indicative of the cooling water temperature and the throttle valve opening from the converter 905 are supplied as data signals to the CPU 902 via the data bus 912 when a signal indicative of termination of each analog-to-digital conversion is supplied to the CPU 902 from the output terminal 905c of the analog to digital converter 905. Upon completion of conversion of one of these digital signals to the CPU 902, the same process as above is once again effected to cause inputting of the other digital signal to the CPU 902. Further, an electrical load-indicative signal from the electrical load sensor means 15' has its voltage level shifted to a predetermined level by the level shifter 904 and then applied to the CPU 902.

The CPU 902 operates on these input data signals, i.e. the engine rpm signal, the electrical load signal, the engine water temperature signal and the throttle valve opening signal to determine whether the control of the supplementary air quantity should be effected in feedback mode or in decelerating mode. More specifically, the CPU 902 judges that the decelerating control should be effected when the throttle vale opening signal shows full closing of the throttle valve and simultaneously the engine rpm Ne signal shows a value lower than the predetermined rpm NA, and the idling rpm feedback control should be effected when the engine speed further decreases so that the engine rpm Ne signal shows a value lower than or equal to the upper limit of the desired idling rpm range, respectively. After the engine has come into the idling rpm feedback control mode, the CPU 902 carries out a determination as to whether or not the preceding loop was in feedback mode when the engine rpm Ne signal shows a value above the upper limit NH of the desired idling rpm range, and if the answer is yes, it decides that the feedback control should still be continued in the present loop. Depending upon the result of the above determination, the CPU 902 calculates the valve opening period DOUT of the control valve 6, and supplies the resulting calculated value to the down counter 909 via the data bus 912, upon inputting of a command signal to the down counter 909 through its load input terminal L, to start counting of the counter 909.

On the other hand, a clock signal generated by the pulse generator 906 is used as a timing signal for the control operation carried by the CPU 902, and at the same time it is subjected to frequency division by the frequency divider 907 into a suitable frequency and then supplied to one terminal of the AND circuit 908.

When the down counter 909 is supplied with a starting command signal from the CPU 902, it is loaded with a calculated value indicative of the desired valve opening period DOUT of the control valve 6 for decelerating control or idling rpm feedback control, supplied from the CPU 902. At the same time, the down counter 909 generates a high level output of 1 at its borrow output terminal $\overline{B}$ and applies it to the other terminal of the AND circuit 908 as well as the solenoid driving circuit 911. The solenoid driving circuit 911 energizes the solenoid 6a of the control valve 6 to open same as long as it is supplied with the above high level output of 1 from the down counter 909.

As long as the AND circuit 908 has its other input terminal supplied with the above high level output of 1 from the down counter 909, it allows clock pulses supplied thereto through its one terminal to be applied to the clock pulse input terminal CK of the down counter 909. The down counter 909 counts the clock pulses, and upon counting up to a number corresponding to the calculated value of the valve opening period DOUT supplied thereto from the CPU 902, it generates a low level output of 0 through its borrow output terminal $\overline{B}$ to cause the solenoid driving circuit 911 to deenergize the solenoid 6a of the control valve 6. At the same time, the above low level output of the down counter 909 is supplied to the AND circuit 908 as well, to interrupt the supply of further clock pulses to the down counter 909.

On the other hand, the fuel supply control unit 903 operates on engine operation parameter signals supplied from the engine rpm sensor 14, the engine water temperature sensor 13, the throttle valve opening sensor 17, the absolute pressure sensor 12 and the other engine operation parameter sensors 18, to calculate a desired value of fuel supply quantity so as to keep the air/fuel ratio of the mixture being supplied to the engine 1 at an optimum value, e.g. a theoretical air/fuel ratio, and to open the fuel injection valve 10 for a period of time corresponding to the calculated value.

What is claimed is:

1. A method for controlling the quantity of supplementary air being supplied to an internal combustion engine in a feedback manner responsive to the difference between actual engine rpm and desired idling rpm, said engine having an intake passage, a throttle valve arranged in said intake passage, and an air passage having one end communicating with said intake passage at a location downstream of said throttle valve and another end with the atmosphere, respectively, said supplementary air being supplied to said engine through said air passage and said intake passage, said method comprising the steps of: (a) comparing an actual value of engine rpm with a first predetermined value which is larger than an upper limit of a desired idling rpm range including said desired idling rpm; (b) comparing said actual value with a second predetermined value which is equal to said upper limit of said desired idling rpm range when it is determined at the step (a) that said actual value is smaller than said first predetermined value; (c) effecting control of the quantity of supplementary air in feedback mode when it is determined at the step (b) that said actual value is smaller than said second predetermined value, (d) determining whether or not the control of the supplementary air was effected in feedback mode immediately before the determination at the step (b) when it is determined at the step (b) that said actual value is larger than said second predetermined value, (e) continuing the feedback control of the quantity of supplementary air when the result of the determination at the step (d) is affirmative, and (f) effecting control of the quantity of supplementary air in decelerating mode in a predetermined manner when the result of the determination at the step (d) is negative.

2. A method as claimed in claim 1, wherein said control of the quantity of supplementary air in decelerating mode comprises gradually increasing the quantity of supplementary air with a decrease in the engine rpm, and holding the quantity of supplementary air at a predetermined value when the engine speed decreases to said second predetermined value.

* * * * *

UNITED STATES PATENT AND TRADEMARK OFFICE
CERTIFICATE OF CORRECTION

PATENT NO. : 4,438,744
DATED : March 27, 1984
INVENTOR(S) : Shumpei Hasegawa

Figure 5:
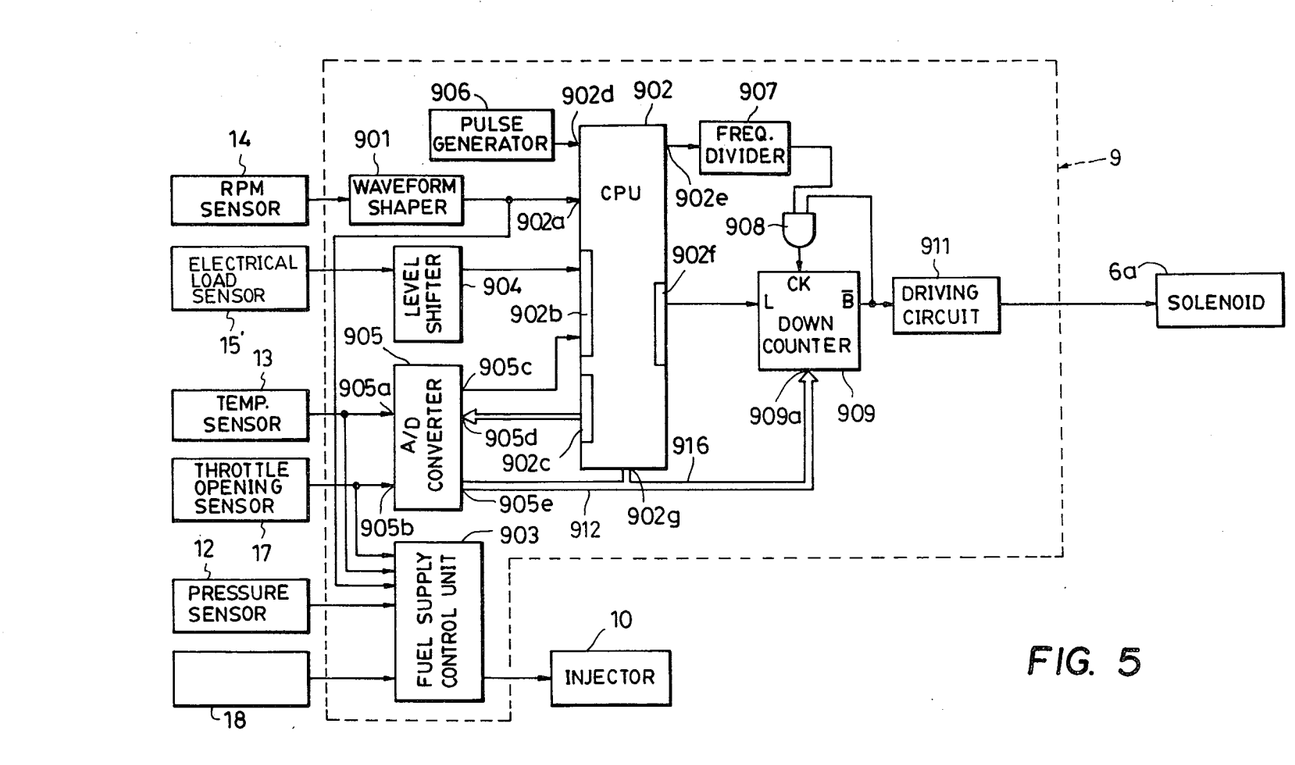
FIG. 5 is a circuit diagram illustrating an electronic circuit within the ECU in FIG. 1.

It is certified that error appears in the above-identified patent and that said Letters Patent is hereby corrected as shown below:

column 1, line 21: change "propsoed" to read "proposed";

column 1, line 24: delete "engine" (first occurrence);

column 1, line 24: change "load of" to read "load on";

column 1, line 26: delete "a quantity of";

column 1, line 27: change "manner responsive" to read "quantity corresponding";

column 6, line 20: change "possibe" to read "possible";

column 7, line 35: change "NA" to read "MA";

column 7, lines 37 and 39: change "Ma" to read "MA";

column 7, line 55: between "18." and "If" insert the following sentence: "If the preceding loop was effected in feedback mode, the program jumps at the step 20 to the aforementioned subroutine SUBFB.";

column 7, line 56: change "20" to read "21";

column 7, line 67: change "Fig. 5" to read "Fig. 1";

column 8, line 14: change "their one input terminals" to read "its one input terminal";

column 8, line 58: change "conversion" to read "inputting";

column 8, line 57: change "analog to digital" to read "analog-to-digital";

UNITED STATES PATENT AND TRADEMARK OFFICE
CERTIFICATE OF CORRECTION

PATENT NO. : 4,438,744

DATED : March 27, 1984

INVENTOR(S) : Shumpei Hasegawa

It is certified that error appears in the above-identified patent and that said Letters Patent is hereby corrected as shown below:

column 9, line 4: change "vale" to read "valve";

column 9, line 28: after "carried" insert "out";

column 9, line 31: before "terminal" insert "input";

column 9, line 39: change "other terminal" to read "other input terminal";

column 9, line 48: change "one terminal" to read "one input terminal".

Signed and Sealed this

Seventh Day of August 1984

[SEAL]

Attest:

GERALD J. MOSSINGHOFF

Attesting Officer     Commissioner of Patents and Trademarks